United States Patent [19]
Steingroever

[11] 3,803,482
[45] Apr. 9, 1974

[54] THICKNESS MEASURING DEVICE UTILIZING MAGNETIC REED CONTACTS

[76] Inventor: Erich Steingroever, Flensburger Str. 33, Bonn, Germany

[22] Filed: Nov. 24, 1972

[21] Appl. No.: 308,939

Related U.S. Application Data

[63] Continuation of Ser. No. 842,625, July 17, 1969, abandoned.

[30] Foreign Application Priority Data
July 20, 1968  Germany............................ 1764702
July 20, 1968  Germany............................ 1773876

[52] U.S. Cl............................................ 324/34 TK
[51] Int. Cl............................................. G01r 33/00
[58] Field of Search.................... 324/34 TK, 34 RS; 335/151–154, 205–207

[56] References Cited
UNITED STATES PATENTS

| | | |
|---|---|---|
| 2,461,202 | 2/1949 | Ellwood............................ 324/34 PS |
| 3,187,127 | 6/1965 | Hess................................... 335/153 |
| 3,252,057 | 5/1966 | Hoeppel............................. 335/153 |
| 3,253,099 | 5/1966 | Hess................................... 324/34 RS |
| 3,349,323 | 10/1967 | Mullen.............................. 324/34 RS |
| 3,397,347 | 8/1968 | Hoeppel............................. 335/151 |

Primary Examiner—Robert J. Corcoran

[57] ABSTRACT

An electrical thickness measuring instrument of the type in which the flux density of an air gap corresponds to the thickness of a layer applied to magnetic material, is composed of a pot shaped enclosure of magnetic material containing an elongated permanent magnet inside extending in an axial direction. One pole of the magnet is magnetically connected with the interior of the pot so that the other magnet pole defines, with the open end of the pot, a first flux path. A second flux path is provided by an electromagnet inside the pot and a magnetic reed contact switch is in a position to be influenced by both flux paths. The amount of energization of the electromagnet required to affect the reed contact switch provides a value corresponding to the thickness measured.

3 Claims, 5 Drawing Figures

THICKNESS MEASURING DEVICE UTILIZING MAGNETIC REED CONTACTS

This is a continuation of copending application Ser. No. 842,625, filed July 17, 1969, now abandoned.

The invention concerns a reed contact oscillating as a result of automatic interruption, and its use for purposes of measurement engineering.

In the case of the invention, the known characteristic of a reed contact is utilized: to switch on in the presence of a magnetic field and to switch off again in the case of the decrease of the magnetic field. Between the switching on-magnetic field strength and the switching off of the magnetic field strength, there is an area in which the reed contact can be switched on or off, depending on the direction of the previous change of the magnetic field strength so that the switching state in this area does not depend unequivocally on the strength of the magnetic field, and a measuring of the magnetic field by means of a reed contact is not possible.

The invention has for its object the measuring of a magnetic field with the help of a reed contact in a dependable manner. It is characterized through the fact that the reed contact is arranged in such a manner with the area of a field coil and switched together with it that, through automatic interruption, a swing oscillation occurs. The mean value of the electric current flowing through the field coil is then unmistakably dependent on the strength of the magnetic field in which the reed contact is located and, in a certain area, it is proportional to it.

The invention refers to a recording and measuring device for magnetic field strengths and for such mechanical values which can cause a change in a magnetic field. These are, for example, the thickness of nonmagnetic layers on iron bases, the distance of an iron part from the measuring instrument, the distance of the measuring instrument from a permanent magnet or the position of a revolvable permanent magnet in relation to the measuring device.

In the case of the invention the known characteristic of a reed contact is utilized, namely to switch on in case of contact of a magnetic field and to switch off again in the case of decreasing of the magnetic field. Such reed contacts hitherto were switched through the magnetic field of a current carrying coil or through the leakage field of a permanent magnet. It has also already been known to premagnetize reed contacts, which are switched through the field of a coil, through a fixedly arranged permanent magnet in order to shift the switching point or in order to make a circuit breaker out of a circuit closer by the field of the permanent magnet counteracting the field of the coil.

The invention rests on a novel cooperation of magnetic field, reed contact and electric winding. It consists of a recording and measuring device for a magnetic and mechanical value with a magnetic system, which is influenced by the value that is to be measured and which is characterized in that the value to be measured is recorded or measured by means of a reed contact controlled with an electric winding, said contact being arranged in the field of the magnet system (influenced by the value to be measured). At the same time, the current passing through the electric winding of the reed contact serves, on the one hand, for the adjustment of the operating point and, on the other hand, as a measure for the value that is to be measured.

Figures 1, 2, 3:
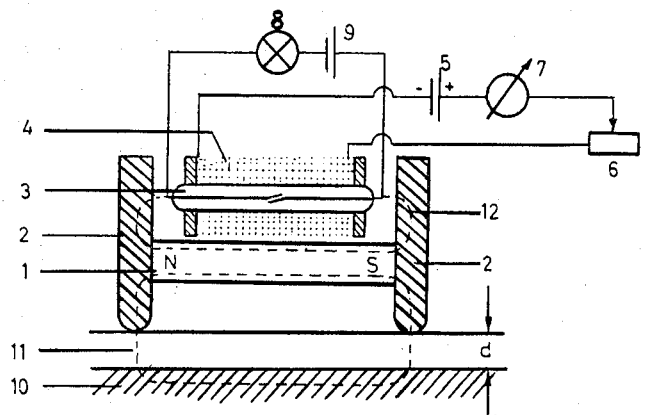
FIG. 1 is a cross-section of one form of device in accordance with the present invention, with an operating electric circuit schematically represented.
FIG. 2 is a modified form of the invention.
FIG. 3 is a schematic representation of another circuit for operating the device.

An embodiment of the invention has been shown in FIG. 1 by way of example. A bar-shaped permanent magnet 1 has been provided with poles N and S made of soft iron between which the reed contact 3 has been placed. This contact is surrounded by an electric winding 4 which is supplied with a current from a current source 5 which can be adjusted through the resistance 6, and whose strength is measured with the instrument 7. The switching state of the reed contact 3 is indicated by the lamp 8, which has been switched in series with it and with the source of current 9. If this arrangement according to the invention is used, for example, as a thickness meter for the thickness $d$ of a non-magnetic layer on a paramagnetic material such as an iron base 10, then a part 11 of the magnetic flux is deflected through this base, so that the magnetic flux 12 will be decreased through the reed contact; as a result of this the current intensity required for switching of the reed contact will be changed through the winding 4 so that the latter becomes a measure for thickness $d$ of the nonmagnetic layer. The intensity of the switching current is found through shifting of the resistance 6 until the signal light 8 lights up or goes out; the adjustment can be made by hand but also with the use of switching on or off of the reed contact with the help of a motor driven resistance. A fixed value of the current intensity, corresponding to a predetermined thickness of the layer, can also be set and the instrument can be used as a recorder showing whether or not the thickness of the layer set has or has not been undercut at the measuring point.

In the case of the design of the invention according to FIG. 2, two magnet systems of the design 1 have been arranged together symmetrically in such a manner that the flux of the two permanent magnets 13 and 14 runs on the path 15, shown with a broken line, through the pole elements 16, 17, 18 and 19 made of soft iron and the nonmagnetic distancing pieces 20 and 21, until a shunt is offered to the flux of one of the magnets 14, for example through the approach of a paramagnetic material such as an iron part 22. In the state of equilibrium, the reed contact 23 is located in a field-free space and therefore is opened, so that the circuit will be interrupted by the signal light 24 from the source of current 25. Upon approach of the magnet system to the iron surface 22, a part of the flux of the magnet 14 is shorted at a certain distance $d$, so that the field of the other magnet 13 is no longer compensated at the place of the reed contact 23, and the reed contact responds, which is recorded through signal light 24 lighting up. Through a current from the current source 27 through the winding 26, which can be adjusted with the resistance 28 to a value which can be measured with the instrument 29, the compensation of the magnetic field will be reestablished at the point of the reed contact; the current intensity required for it is a measure for the distance $d$ of the magnet system that is to be measured from the iron support 22.

A particularly favorable circuit for the device according to the invention according to FIG. 2 is represented in FIG. 3. In it the reed contact 30 with its field coil 31 has been connected in series in such a manner that upon a disturbance of the compensated state of the two magnets 13 and 14 the contact 30 will close at first and the condenser 32 will be charged from the current source 33 via the charging resistor 34. With an increasing voltage of the condenser, a current will also begin to flow through the field coil 31 and the ammeter 35. The field coil is switched in such a manner that its magnet field reestablishes the state of compensation of the magnetic field on the reed contact 30, so that upon reaching a sufficiently high current intensity the current will be interrupted. Now the condenser discharges via the field coil and the ammeter until the contact 30 is again closed and the process starts anew. A saw-tooth like current, the mean value of which is recorded by the instrument and which is a measure for the distance $d$ that is to be measured, flows through the instrument 35. But with the change in the compensation state a change in frequency of the switching process is also connected, which can be utilized for a recording of the value to be measured, be that in an electrical way, in which for example the primary winding of a transformer is switched between the current source 33 and the charging resistor 34, on the secondary side of which transformer an alternating voltage occurs which is to be recorded, or be that acoustically, for example by a loudspeaker being switched in series with the current source, which emits a sound the pitch of which changes with the value to be measured. This circuit according to the invention according to FIG. 3 has the particular advantage that in the compensated state (whenever the influence of the value that is to be measured is zero) no current at all will flow, so that the current source will be under load only in the moment of measuring (for example of the thickness of a layer).

Figure 4:
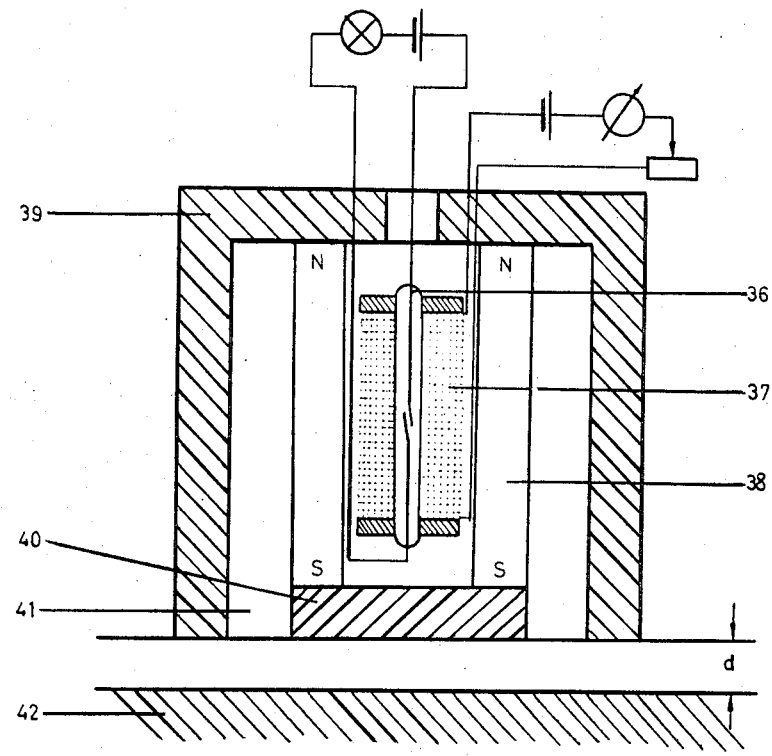
FIG. 4 is a view, similar to that of FIG. 1, showing another modification.
Figure 5:
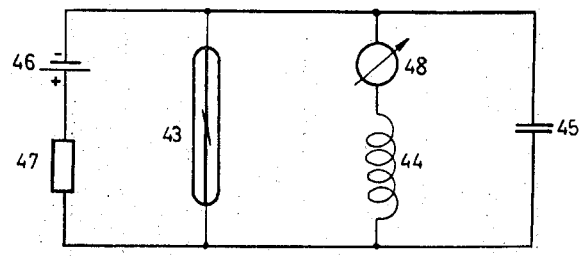
FIG. 5 is a schematic representation of a modified circuit arrangement.

A further development of the invention is shown in FIG. 4. In that case, reed contact 36, field coil 37 and an annular, axially magnetized magnet 38 with poles N and S have been arranged concentrically in an iron pot 39 and as a result have been screened completely from outside influences which do not come from the lower face side. The magnet has been equipped with a pole plate 40 made of iron. Its flux runs partly through the inside space (from pole plate 40 to the bottom of pot 39), so that the reed contact 36 is switched on, and for the other part through the air gap in the direction of the edge of the iron pot. Upon approach of a parameg-netic material such as the iron part 42 (in the case of a design of the invention as a thickness meter), the flux to the edge of the pot will be increased in dependence on the distance $d$, at the expense of the flux through the magnet inside space and as a result of that the reed contact will be opened at a certain thickness $d$. The recording of the thickness is accomplished with a circuit as in FIG. 1. But a sweep circuit according to FIG. 5 can also be used. In that case the reed contact in its rest state (that is to say, in the case of use of the device according to FIG. 4 as a thickness meter in the case of a considerable distance $d$) short circuits its field coil 44 and condenser 45 switched in parallel to it, so that only a rest current will flow from the current source 46 via resistance 47. If through the approach of part 42 the field becomes weaker at the place of the reed contact, then the reed contact is opened, the condenser 45 is charged and a current of increasing intensity flows through field coil 44 which had been poled in such a manner that upon reaching a certain current intensity the contact 43 closes again and the charging of the condenser is interrupted. The latter discharges via the reed contact and the field coil, it becomes dead, so that the reed contacts opens again, whereupon the process begins all over. A saw-tooth like current flows through the instrument 48, the mean value of which is recorded and which is a measure for the distance $d$ that is to be measured. With a change in the recording, a change in frequency of the switching process is also connected which can likewise be used for recording of the value that is to be measured, as explained in the case of the circuit according to FIG. 3 in accordance with the invention.

In the examples, the use of the invention as a thickness or distance meter was shown. The invention as such (especially in the design according to FIG. 2) can also be used in printing machines and in paperworking machines in order to record the occurrence of double sheets, which can lead to disturbances in the processing. In the case of use as a thickness meter or distance meter, the magnet system of the device according to the invention and as shown can be influenced by an iron element. But it is also possible to use another permanent magnet or electromagnet for influencing and to record the distance from said electromagnet or the angular position of rotatable magnets.

In a further use of the invention, it can also be utilized for the measurement of the strength of permanent magnets or of magnetic fields, to the values of which it will respond just as in the case of its use as a thickness meter. If the poles are suitably designed, it will be possible to measure magnetic terrestrial fields or disturbances of the magnetic field through ferromagnetic masses, for example through iron pipes or through permanent magnets which have been attached to an object for the testing of certain areas such as a pipe line in the ground, in walls, etc., which tests can then be recorded. In the search for such objects an oscillator circuit, particularly according to FIG. 3 or FIG. 5, will be advantageous, because the distance from the object searched for is made audible directly through the acoustic frequency.

The magnet system of the invention can be excited not only by means of permanent magnets, but also through an electric current which flows through a winding in the area in which the reed contact has been disposed. In that case an adjustment of the magnetic field and thus of the operating point of the reed contact through the current intensity exists as a further possibility. In the case of use of permanent magnets, the magnet field can take place through demagnetizing of the magnets up to the desired operating point.

If, in the case of a reed contact operating in accordance with the invention, the outside magnetic field is kept constant, then the mean value of the current through the field coil will remain constant, even in the case of changes of the voltage, of current source and changes of temperature, etc. The invention can, therefore, be used for the production of a constant current. If the magnetic field is made adjustable, then the current strength can be adjusted to constant values in a simple manner.

The invention is also particularly suited for the production of low-frequency swing oscillations as required for blinking lights.

What is claimed is:

1. In an electrical thickness measuring instrument of the type which is responsive to the flux density of a non-magnetic measuring gap to determine said thickness, comprising a pot shaped enclosure of magnetic material, at least one elongated permanent magnet means disposed within said enclosure and extending in a direction parallel to the axis of said pot, one end of said permanent magnet means including a disc-shaped pole piece of magnetic material arranged in the plane of the margin of the open end of said pot and defining with said margin a non-magnetic gap, the other end of said permanent magnet means being connected to the interior of said pot to provide a first closed flux path which includes said nonmagnetic gap, electromagnetic field coil means disposed within said enclosure for generating a second flux path, and magnetic reed contact switch means disposed in said enclosure in said first and second flux paths and also responsive to changes in the flux in said first flux path and also to changes in the flux in said second flux path generated by energization of said electromagnetic field coil means.

2. The invention defined in claim 1, wherein said permanent magnet means comprises a tubular permanent magnet, disposed concentrically in said pot, said other end of the permanent magnet means being attached to the closed end of said pot.

3. The invention defined in claim 2, wherein said electromagnetic field coil means is concentrically disposed within said tubular permanent magnet means, and said reed contact switch means is disposed concentrically within said field coil means.

* * * * *

UNITED STATES PATENT OFFICE
CERTIFICATE OF CORRECTION

Patent No. 3,803,482  Dated April 9, 1974

Inventor(s) Erich Steingroever

It is certified that error appears in the above-identified patent and that said Letters Patent are hereby corrected as shown below:

The assignee should read

-- Elektro-Physik, Hans Nix & Dr. Ing. E. Steingroever KG, Koln-Niehl, Germany, a corporation of Germany --.

Signed and sealed this 24th day of September 1974.

(SEAL)
Attest:

McCOY M. GIBSON JR.
Attesting Officer

C. MARSHALL DANN
Commissioner of Patents